(12) United States Patent
Watanabe et al.

(10) Patent No.: US 6,401,030 B1
(45) Date of Patent: Jun. 4, 2002

(54) INFORMATION PROCESSING APPARATUS AND METHOD, AND PROGRAM STORAGE MEDIUM

(75) Inventors: Ryuichi Watanabe; Takashi Kuwayama, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/704,629

(22) Filed: Nov. 2, 2000

(30) Foreign Application Priority Data

Nov. 12, 1999 (JP) ............................................. 11-32898
Nov. 12, 1999 (JP) ........................................... 11-321899
Jan. 20, 2000 (JP) ....................................... 2000-011703

(51) Int. Cl.$^7$ ........................................... G06F 165/00
(52) U.S. Cl. ...................... 701/202; 701/208; 701/209; 701/210
(58) Field of Search ............................... 701/202, 204, 701/207, 208, 209, 210, 213

(56) References Cited

U.S. PATENT DOCUMENTS 5,613,600 A    3/1997  Yokoji et al. ............... 200/564
5,961,572 A *  9/1999  Craport et al. .............. 701/207
6,029,112 A *  2/2000  Nam et al. ................. 701/202
6,278,942 B1 * 8/2001  McDonough ............... 701/210

FOREIGN PATENT DOCUMENTS

JP          8-203387       8/1996      .......... H01H/25/00

* cited by examiner

Primary Examiner—Richard M. Camby
(74) Attorney, Agent, or Firm—Oblon, Spivak, McClelland, Maier & Neustadt, P.C.

(57) ABSTRACT

An information processing apparatus is disclosed which comprises: an inputting element for inputting a departure point and a destination; a nearby station retrieving element for retrieving stations located near the departure point and the destination which were input through the inputting element; a train route searching element which, if there are a plurality of stations near at least either the departure point or the destination, the nearby stations having been retrieved by the nearby station retrieving element, then searches for at least one train route for each of all nearby station combinations linking the departure point to the destination; a storing element for storing the train routes retrieved by the train route searching element; a setting element for setting prioritizing conditions to be referenced when the train route searching element searches for train routes; and a ranking element for ranking the train routes stored in the storing element in accordance with the prioritizing conditions set by the setting element.

14 Claims, 14 Drawing Sheets

INFORMATION PROCESSING APPARATUS AND METHOD, AND PROGRAM STORAGE MEDIUM

BACKGROUND OF THE INVENTION

The present invention relates to an information processing apparatus, an information processing method, and a program storage medium for finding an optimum route from a departure point to a destination. More particularly, the invention relates to an information processing apparatus, an information processing method, and a program storage medium for outputting a standard and a backup itinerary of an optimum route from a departure point to a destination along with a detailed map of a specific segment of the route where necessary, thereby creating a comprehensive guide map which shows necessary itinerary and route information and which may present itineraries in a flexible manner.

Computer software designed to search for desired train routes is gaining widespread use. Programs of this kind typically allow a departing train station and an arriving train station to be designated in order to seek an optimum train route therebetween according to prioritizing conditions such as the travel time and fares involved, whereby an itinerary of the obtained optimum train route is output.

It is relatively rare that a departure point and a destination coincide with train stations; these points are generally located away from the stations. If only one station is near the departure point and solely one station is close to the destination, conventional route search programs constitute a method sufficient to search for a train route between the two stations. However, if there are a plurality of accessible train stations near the departure point and/or the destination as is generally the case, it is necessary to search separately for each of multiple routes between these stations. When these routes are all retrieved, there have often been no measures to preserve the retrieved routes. Without arrangements for storing the results of such train route search, there is no way of comparing the different routes to find an optimum one. Meanwhile, information about routes to train stations near the departure point and destination may be obtained by referring to associated map software that is furnished separately from train-related information. Typically, however, map software contains only maps that are limited to the neighborhoods of the stations. To acquire a map detailing a route from a desired location to a nearby station requires employing another set of map software.

SUMMARY OF THE INVENTION

The present invention has been made in view of the above circumstances and provides an information processing apparatus, an information processing method, and a program storage medium for searching for and retrieving an optimal route between two of accessible train stations near a departure point and a destination, the two stations being optimally selected by the apparatus and method as well. The invention also provides an information processing apparatus, an information processing method, and a program storage medium for simultaneously outputting a standard itinerary of an optimum route, a backup itinerary that may be followed if a departure time of the standard itinerary is missed, and a map of a specific segment of the optimum route as needed, thereby creating a comprehensive guide map which shows necessary itinerary and route information and which may present itineraries in a flexible manner.

Other objects, features and advantages of the invention will become more apparent upon a reading of the following description and appended drawings.

BRIEF DESCRIPTION OF THE DRAWINGS

FIG. 8 is a view of another setting screen displayed on the LCD in FIG. 1;

FIG. 9 is a view of a search result display screen appearing on the LCD in FIG. 1;

DESCRIPTION OF THE PREFERRED EMBODIMENTS

Figure 1:
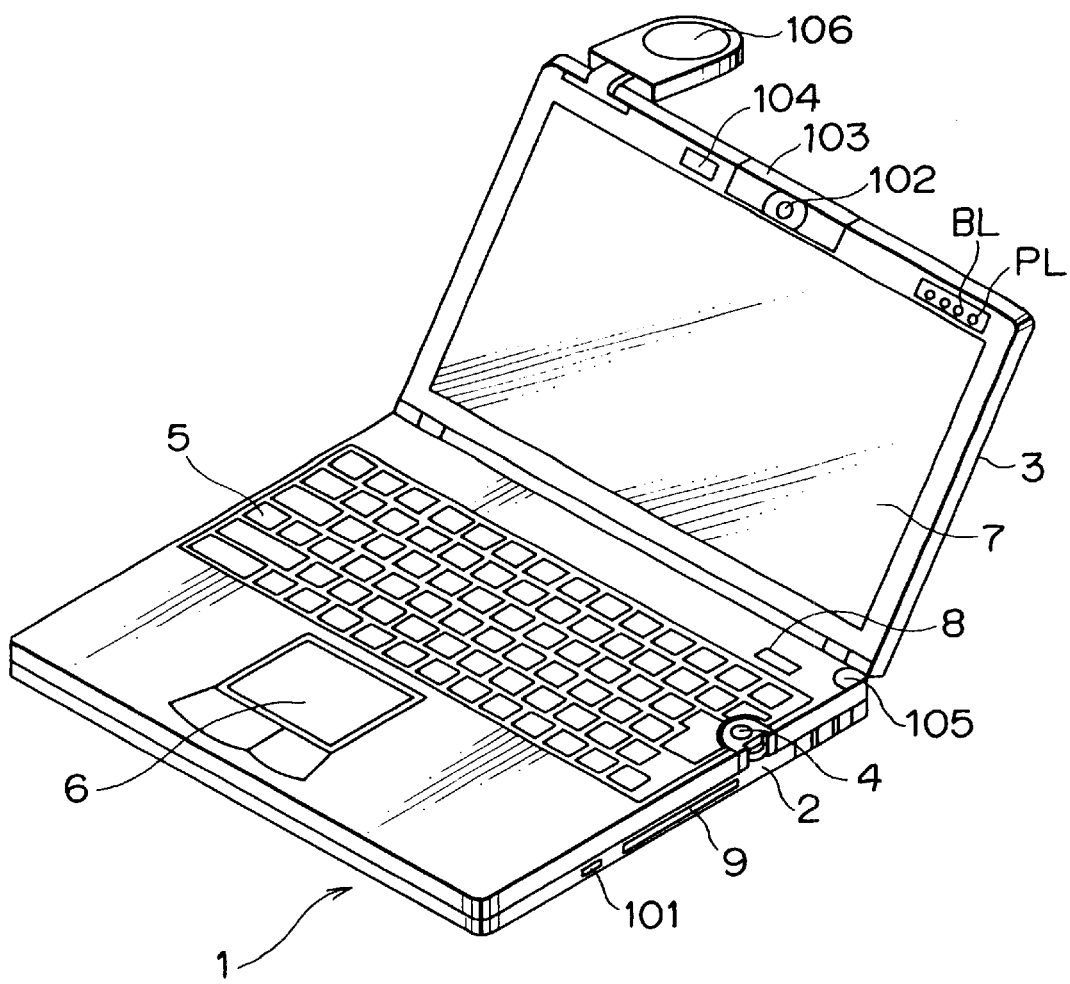
FIG. 1 is a perspective view of a personal computer 1 to which this invention is applied.
Figure 2:
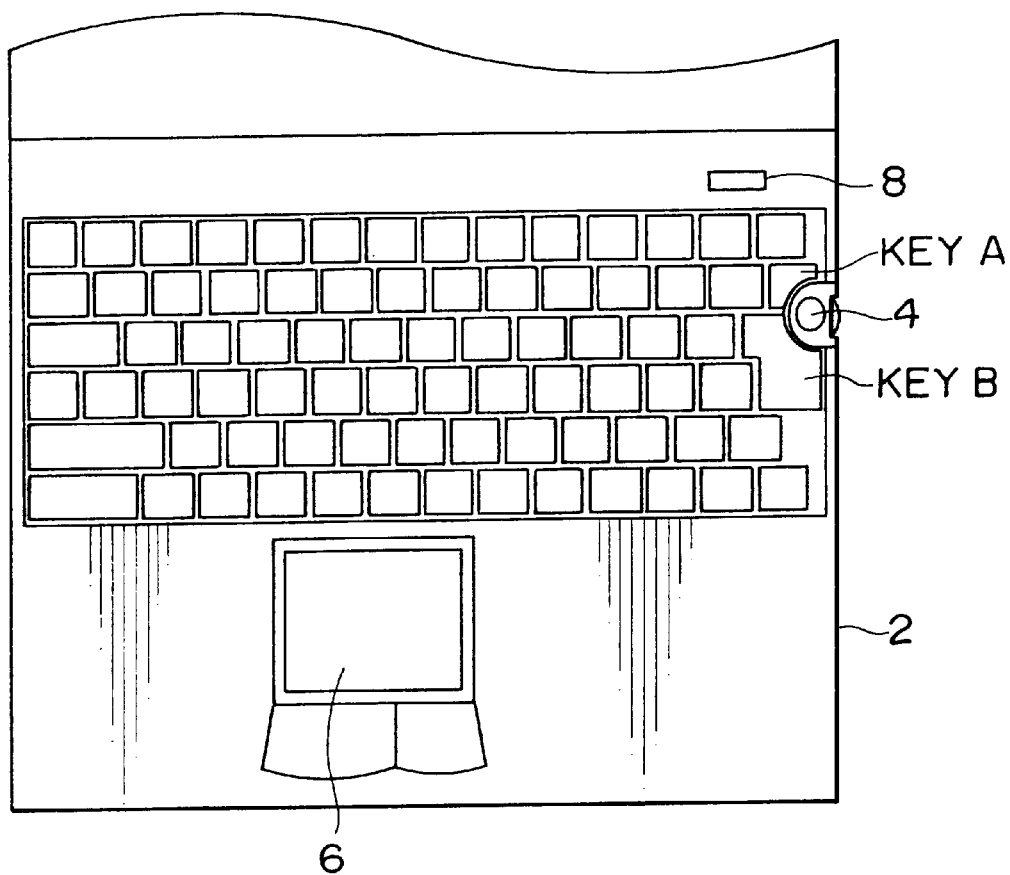
FIG. 2 is a plan view of the main body of the personal computer shown in FIG. 1.
Figure 3:
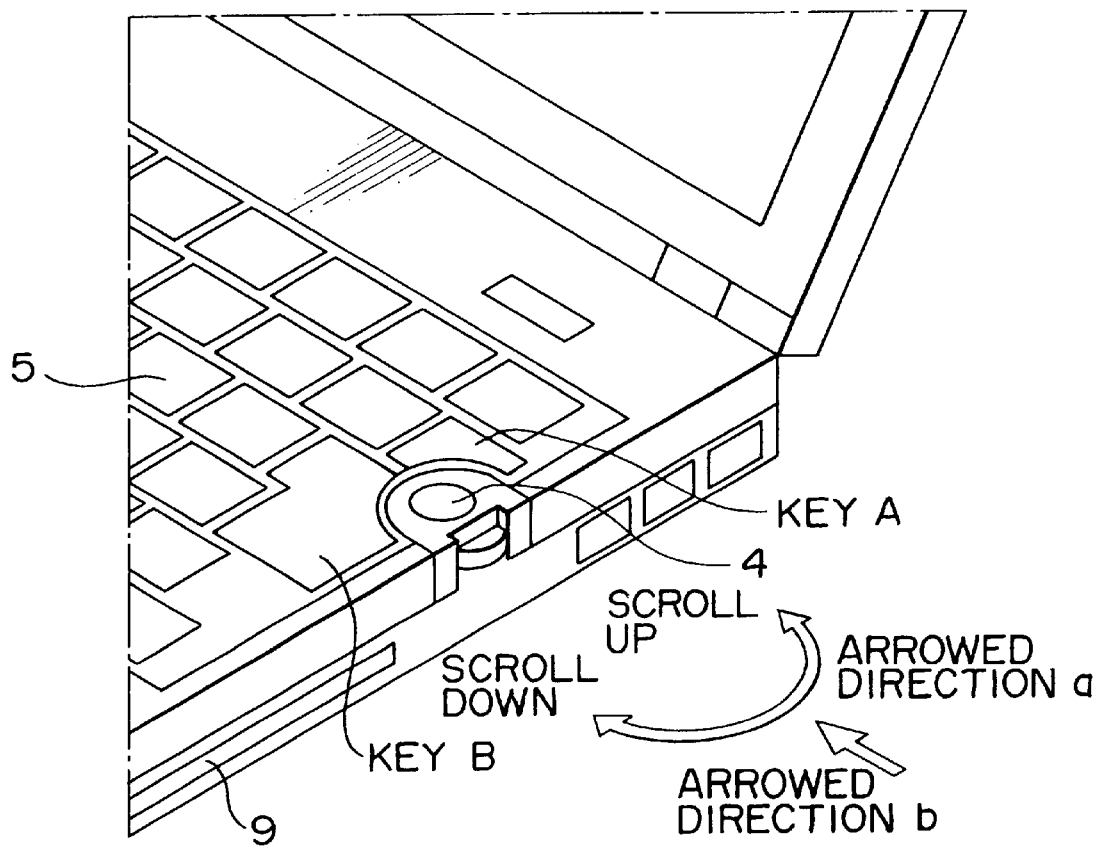
FIG. 3 is an enlarged view of a jog dial in FIG. 1.
Figure 4:
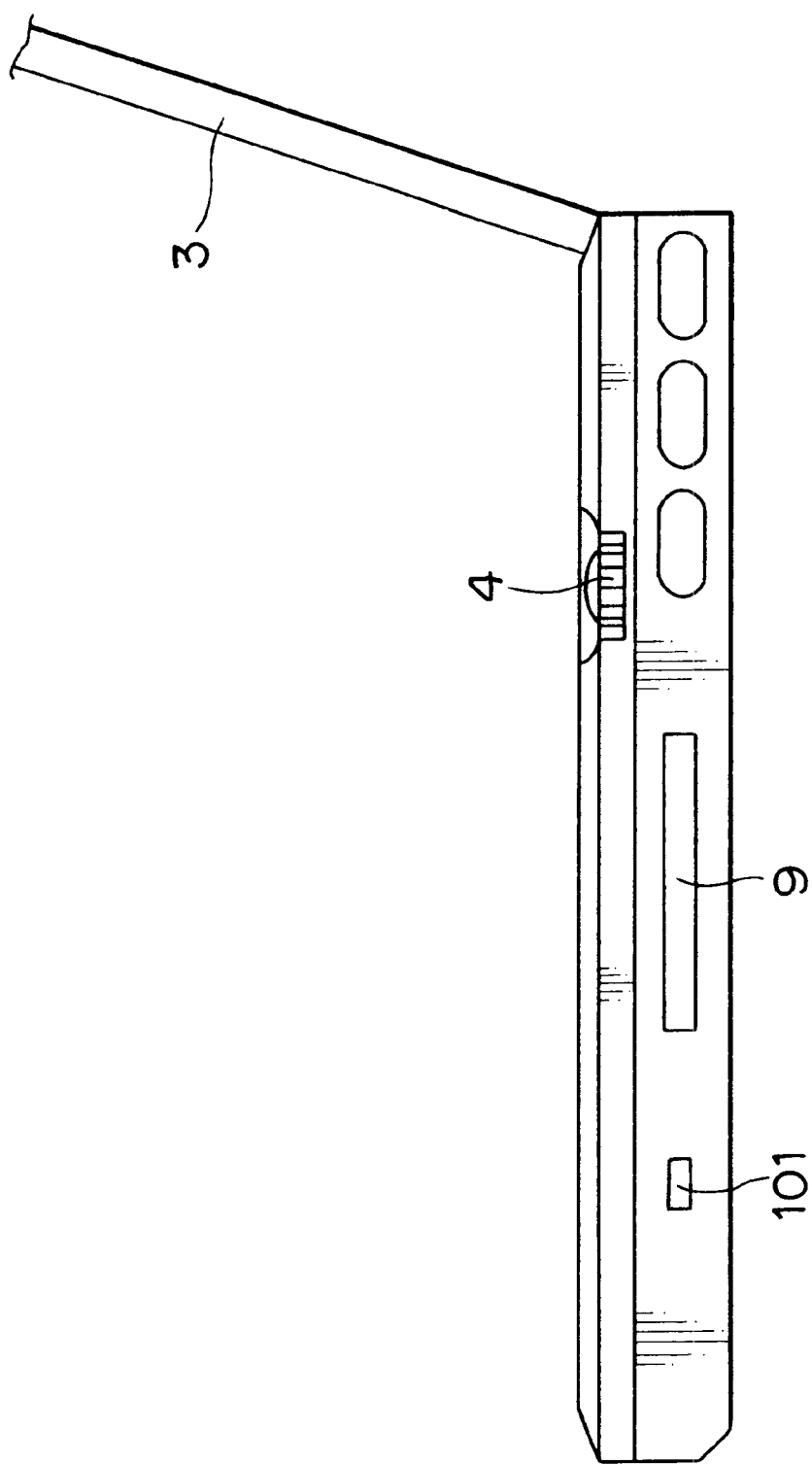
FIG. 4 is a side view of the jog dial in FIG. 1.

FIGS. 1 through 4 show external views of a notebook type personal computer embodying the invention. The personal computer 1 is primarily comprised of a main body 2 and a display unit 3 that is attached swingingly to the main body 2. FIG. 1 is a perspective view showing how the display unit 3 is typically opened away from the main body 2. FIG. 2 is a plan view of the main body 2. FIG. 3 is an enlarged view of a jog dial 4 (described later) attached to the main body 2. FIG. 4 is a side view of the jog dial 4 furnished on the main body 2.

The top of the main body 2 comprises a keyboard 5, a touch-sensitive pad 6, and a power switch 8. The keyboard 5 is operated to enter various characters and symbols. The touch-sensitive pad 6 is used as a pointing device for moving a displayed pointer (i.e., mouse cursor) on an LCD 7. One side of the main body 2 is equipped with the jog dial 4, an IEEE 1394 port 101 and other components. The touch-sensitive pad 6 may be replaced by a stick type pointing device.

The front of the display unit 3 is equipped with the LCD (liquid crystal display) 7. In the top right corner of the display unit 3 are indicator lamps including a power lamp PL, a battery lamp BL, a message lamp ML (not shown) that is furnished as needed, and other LEDs. In the top middle of the display unit 3 are a microphone 104 and an imaging unit 103 having a CCD video camera 102 equipped with a CCD (charge coupled device). In the top right corner of the main body 2, as shown in FIG. 1, is a shutter button 105 for operating the video camera 102. The imaging unit 103 is attached rotatably to the display unit 3. Illustratively, a user may rotate the imaging unit 103 from a position from which the CCD video camera 102 took pictures of the user facing the personal computer 1 operating it, into a position from which the imaging unit 103 takes pictures of what turns up in front of the user as viewed by him or her.

Alternatively, the power lamp PL, battery lamp BL, message lamp ML and other indicator lamps may be located on the bottom edge of the display unit 3.

Illustratively, the jog dial 4 is furnished interposingly between a key A and a key B on the right-hand side of the keyboard 5 of the main body 2. In FIG. 2, the dial being substantially flush with the two keys. When operated rotatably in a direction "a" in FIG. 3, the jog dial 4 carries out a predetermined process accordingly (e.g., scrolling a screen); when moved in a direction "b," the jog dial 4 executes another predetermined process corresponding to the action (e.g., selecting an icon).

Alternatively, the jog dial 4 may be located on the left-hand side of the main body 2, or on the right-hand or left-hand side of the display unit 3 comprising the LCD 7. As another alternative, the jog dial 4 may be located lengthwise between a G key and an H key on the keyboard 5 (i.e., in such a way that the jog dial 4 rotates in the direction of either a Y key or a B key).

The jog dial 4 may also be located in the front middle of the main body 2 in such a manner that the dial may be manipulated by the thumb while the touch-sensitive pad 6 is being operated by the index finger. Alternatively, the jog dial 4 may be furnished crosswise along the top or bottom edge of the touch-sensitive pad 6, or lengthwise between the right and the left button of the pad 6. As a further alternative, the jog dial 4 may be furnished not lengthwise or crosswise but slantwise at a suitable angle so that the dial may be operated easily by any finger. As an even further alternative, the jog dial 4 may be provided on one side of a mouse used as a pointing device, the dial being so located as to be operable by the thumb. The jog dial 4 may illustratively be a push-switch-equipped rotatable electronic component disclosed in Japanese Published Unexamined Patent Application No. Hei 8-203387 filed jointly by this and other applicants.

A GPS (Global Positioning System) antenna 106 is attached to the display unit 3. On receiving pseudo noise codes from a group of GPS satellites, not shown, the GPS antenna 106 supplies signals representing the received the codes to the personal computer 1 via a USB (Universal Serial Bus) port, to be described later.

The IEEE (Institute of Electrical and Electronics Engineers) 1394 port 101 is structured as per the IEEE 1394 provisions. The port 101 accommodates a cable that is in compliance with the IEEE 1394 requirements.

Figure 5:
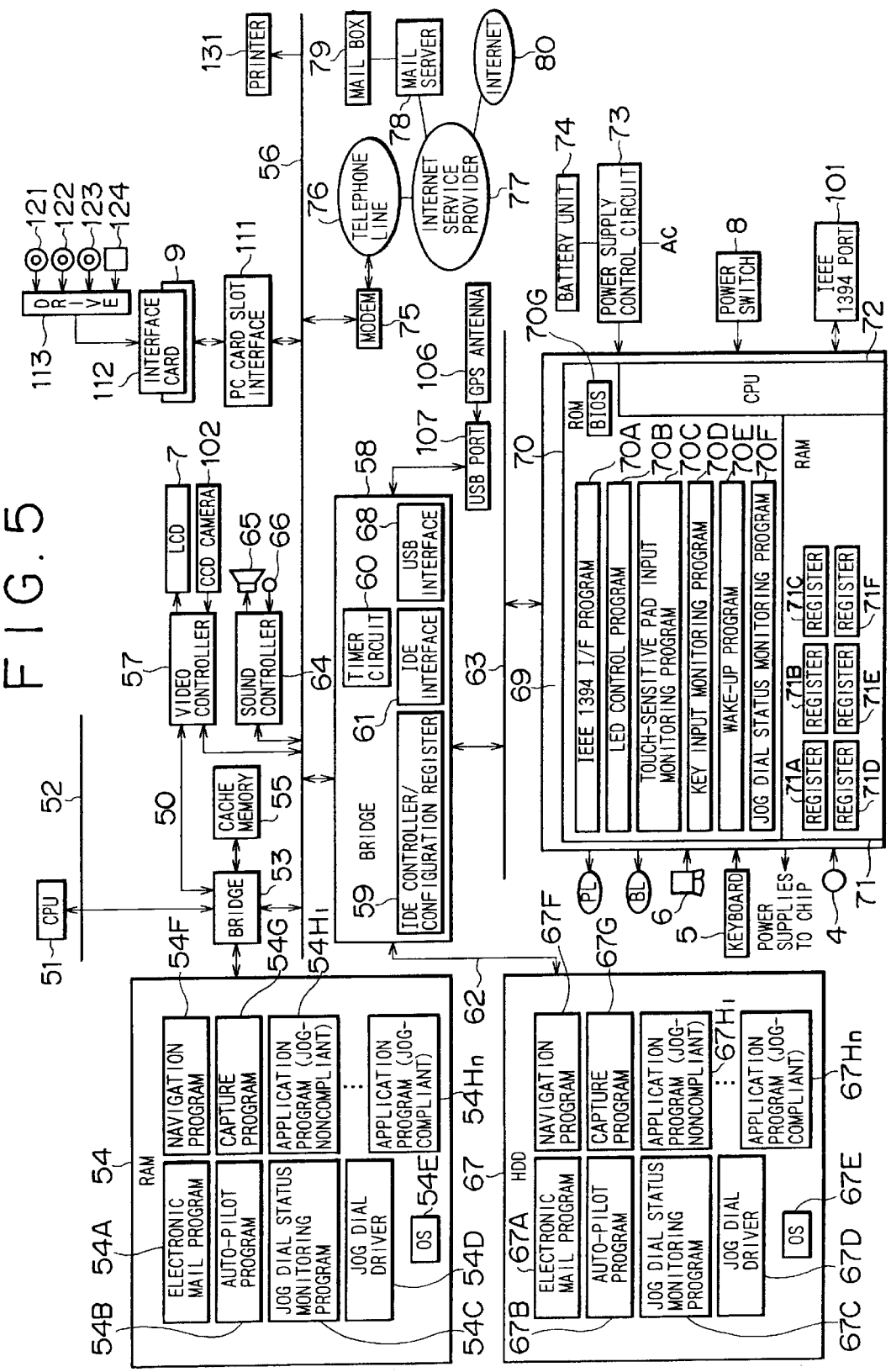
FIG. 5 is a block diagram depicting a structure of the personal computer in FIG. 1.

Described below with reference to FIG. 5 is a typical constitution of the personal computer 1 practiced as one embodiment of this invention.

A CPU (central processing unit) 51 is illustratively composed of Intel Corporation's Pentium (registered trademark) processor or the like and connected to a host bus 52. The host bus 52 is also connected with a bridge 53 (so-called north bridge). The bridge 53 has an AGP (Accelerated Graphics Port) 50 and is connected to a PCI (Peripheral Component Interconnect/Interface) bus 56.

The bridge 53 is illustratively Intel Corporation's AGP Host Bridge Controller 400BX which controls the CPU 51 and a RAM (random-access memory) 54 serving as a main memory and so on. The bridge 53 also controls a video controller 57 by way of the AGP 50. The bridge 53 and another bridge 58 (so-called south bridge; PCI-ISA bridge) constitute what is known as -a chip set.

The bridge 53 is connected further to a cache memory 55. The cache memory 55 is a memory arrangement that permits faster write and read operations thereto and therefrom than the RAM 54 such as an SRAM (static RAM). In operation, the cache memory 55 caches (i.e., temporarily stores) programs or data for use by the CPU 51.

The CPU 51 incorporates a primary cache memory (a memory that is operable faster than the cache memory 55 and controlled by the CPU 51).

The RAM 54 is illustratively made of a DRAM (dynamic RAM) that holds programs executed by the CPU 51 or retains data needed by the CPU 51 while operating. Illustratively, immediately after boot-up, the RAM 54 accommodates an electronic mail program 54A, an auto-pilot program 54B, a jog dial status monitoring program 54C, a jog dial driver 54D, an operating system (OS) 54E, a navigation program 54F, a capture program 54G, and other application programs 54H1 through 54Hn.

The electronic mail program 54A is a program that receives message texts (known as e-mail) over a communication line such as a telephone line 76 via a modem 75. The electronic mail program 54A has an incoming mail acquisition function. This function checks to see if any pieces of mail addressed to the user have arrived in a mail box 79 of a mail server 78 furnished by an Internet service provider 77. If relevant mail is judged to have arrived in the mail box 79, the incoming mail acquisition function performs necessary processes to acquire the mail.

The auto-pilot program 54B activates a plurality of predetermined processes (or programs) in a predetermined sequence to effect sustained processing.

The jog dial status monitoring program 54C receives from each of the above-mentioned application programs a notice advising whether or not the program in question is compatible with the jog dial 4. If an application program is judged responsive to the jog dial 4, the jog dial status monitoring program 54C causes the LCD 7 to indicate what can be achieved by operation of the jog dial 4.

The jog dial status monitoring program 54C detects an event of the jog dial (i.e., the event refers to revolutions in the arrowed direction "a" or to a pushing action in the direction "b" as shown in FIG. 3) , and performs a process corresponding to the detected event. In addition, the jog dial status monitoring program 54C has a list of notices that may be received from the application programs. The jog dial driver 54D carries out various functions in response to how the jog dial 4 is operated.

The OS (operating system) 54E is a program that controls basic operations of the computer, such as Windows 95 (trademark) or Windows 98 (trademark) from Microsoft Corporation, Mac OS (trademark) from Apple Computer Inc., or the like.

The navigation program 54F receives pseudo noise codes from the GPS antenna 106 and performs a code correlation process to decode the received codes. The program 54F also generates data indicative of a signal propagation time of each of the pseudo noise codes coming from GPS satellites (i.e., the propagation time signifies a period that has elapsed from the time a pseudo noise code was output by any one GPS satellite until the code reaches the antenna 106). Based on the decoded data (comprising GPS satellite positions and clock errors) and the generated code propagation times, the navigation program 54F computes the current position of the computer. With the current position thus acquired, the navigation program 54F causes the LCD 7 to display a map image reflecting the obtained position of the computer.

The video controller 57 receives data (such as image data or text data) from the CPU 51 through the bridge 53 and AGP 50 connected to the controller. Upon receipt of the data, the video controller 57 either generates image data corresponding to the received data or stores the received data unmodified. The video controller 57 causes the LCD 7 of the display unit 3 to display images reflecting the stored image data. In addition, the video controller 57 forwards the video data from the CCD video camera 102 to the RAM 54 over the PCI bus 56.

The PCI bus 56 is connected with a sound controller 64. The sound controller 64 receives audio signals from a microphone 66, generates data representative of the received audio signals, and outputs the generated data to the RAM 54. The sound controller 64 also drives a speaker 65 to effect an audio output.

The modem 75 is connected to the PCI bus 56. Over the public telephone line 76 and via the Internet service provider 77, the modem 75 transmits data onto a communication network 80 such as the Internet or to the mail server 78, and receives data from the network 80 or from the mail server 78.

A PC card slot interface 111 is connected to the PCI bus 56. The interface 111 supplies the CPU 51 or RAM 54 with data coming from an interface card 112 inserted into a slot 9, and outputs data given by the CPU 51 to the interface card 112. Drives 113 are connected to the PCI bus 56 through the PC card slot interface 111 and interface card 112.

The drives 113 read data from a magnetic disc 121, an optical disc 122, a magneto-optical disc 123, or a semiconductor memory 124. The retrieved data are forwarded by the drives 113 to the RAM 54 through the PC card interface 111, interface card 112, and PCI bus 56.

The PCI bus 56 is also connected with the bridge 58 (so-called south bridge). The bridge 58 is illustratively composed of PIIX4E from Intel Corporation, and includes an IDE (Integrated Drive Electronics) controller/configuration register 59, a timer circuit 60, an IDE interface 61, and a USB interface 68. The bridge 58 controls diverse input/output (I/O) operations of such devices as those connected to an IDE bus 62 or those connected by means of an ISA/EIO (Industry Standard Architecture/Extended Input Output) bus 63 or an I/O interface 69.

The IDE controller/configuration register 59 comprises a configuration register and two IDE controllers, i.e., a primary IDE controller and a secondary IDE controller, not shown.

The primary IDE controller is connected to an HDD 67 via the IDE bus 62. Where a so-called IDE device such as a CD-ROM or an HDD (not shown) is attached to another IDE bus, the attached IDE device is electrically connected to the secondary IDE controller.

The HDD 67 contains an electronic mail program 67A, an auto-pilot program 67B, a jog dial status monitoring program 67C, a jog dial driver 67D, an OS 67E, and a plurality of application programs such as a navigation program 67F, a capture program 67G, and other application programs 67H1 through 67Hn. During boot-up, the electronic mail program 67A, auto-pilot program 67B, jog dial status monitoring program 67C, jog dial driver 67D, OS 67E, navigation program 67F, capture program 67G, and other application programs 67H1 through 67Hn are retrieved from the HDD 67 and loaded successively into the RAM 54.

The USB interface 68 receives pseudo noise codes from the GPS antenna 106 connected via the USB port 107, and transmits the received pseudo noise codes to the RAM 54 over the PCI bus 56.

The ISA/EIO bus 63 is connected to the I/O interface 69 made of an embedded controller. A ROM 70, a RAM 71 and a CPU 72 are interconnected within the I/O interface 69.

The ROM 70 stores beforehand an IEEE 1394 interface program 70A, an LED control program 70B, a touch-sensitive pad input monitoring program 70C, a key input monitoring program 70D, a wake-up program 70E, and a jog dial status monitoring program 70F.

The IEEE 1394 interface program 70A transmits and receives data (data packets) complying with the IEEE 1394 provisions through the IEEE 1394 port 101. The LED control program 70B controls activation and deactivation of the power lamp PL, battery lamp BL, message lamp ML (where applicable), and other LEDs. The touch-sensitive pad input monitoring program 70C is a program that monitors inputs made by the user through the touch-sensitive pad 6.

The key input monitoring program 70D monitors inputs made from the keyboard 5 or from other key switches. The wake-up program 70E checks to see if a predetermined time of day is reached on the basis of current time data fed from the timer circuit 60 in the bridge 58. When the predetermined time is judged to be reached, the wake-up program 70E activates a relevant process (or program) by suitably managing power supply to the chips constituting the personal computer 1. The jog dial status monitoring program 70E provides a continuous monitoring of whether a rotary encoder of the jog dial 4 is turned and whether the jog dial 4 has been pushed.

The ROM 70 has a BIOS (Basic Input/Output System) 70G written therein. The BIOS 70G controls data exchanges (input and output) between the OS or application programs on the one hand, and peripheral devices-(touch-sensitive pad 6, keyboard 5, HDD 67, etc.) on the other hand.

The RAM 71 has registers 71A through 71F including an LED control register, a touch-sensitive pad input status register, a key input status register, a time setting register, a jog dial status monitoring I/O register, and an IEEE 1394 interface register. Illustratively, a predetermined value is set to the LED control register when the electronic mail program 54A is activated by a pushing action of the jog dial 4. In response to the set value, the message lamp ML is turned on. Pushing the jog dial 4 sets a predetermined operation key flag to the key input status register. A time of day is set to the time setting register when the user operates the keyboard 5 or the like to enter the appropriate time.

The I/O interface 69 is connected through a connector, not shown, to the jog dial 4, keyboard 5, touch-sensitive pad 6, IEEE 1394 port 101, and shutter button 105. When the jog dial 4, keyboard 5, touch-sensitive pad 6 or shutter button 105 is operated, the I/O interface 69 outputs a signal corresponding to the action onto the ISA/EIO bus 63. The I/O interface 69 also controls data exchanges with connected devices by way of the IEEE 1394 port 101. Furthermore, the I/O interface 69 is connected with such lamps as the power lamp PL, battery lamp BL, message lamp ML and other LEDs, as well as with a power supply control circuit 73.

Connected to an internal battery unit 74 or an AC power supply, the power supply control circuit 73 supplies necessary power to the blocks making up the embodiment and controls charging of the internal battery unit 74 and second batteries in peripheral devices. The I/O interface 69 monitors the power switch 8 that is operated to turn on and off power.

Even when power is turned off, the I/O interface 69 relies on an internal power supply to execute programs including the IEEE 1394 interface program 70A through the jog dial status monitoring program 70F. In other words, the programs ranging from the IEEE 1394 interface program 70A to the jog dial status monitoring program 70F are constantly in operation.

With the power switch 8 turned off to bar the CPU 51 from executing the OS 54E, the I/O interface 69 still keeps running the jog dial status monitoring program 70F. Thus if the jog dial 4 is pushed in power-saving mode or in a power-off state, the personal computer 1 starts predetermined software or activates a relevant script file process.

Because the jog dial 4 of the personal computer 1 has a programmable power key (PPK) function as described, there is no need to install a dedicated key for the purpose. A printer 131 is connected to the PCI bus 56. Given commands from the CPU 51, the printer 131 prints various print-ready data.

Figure 6:
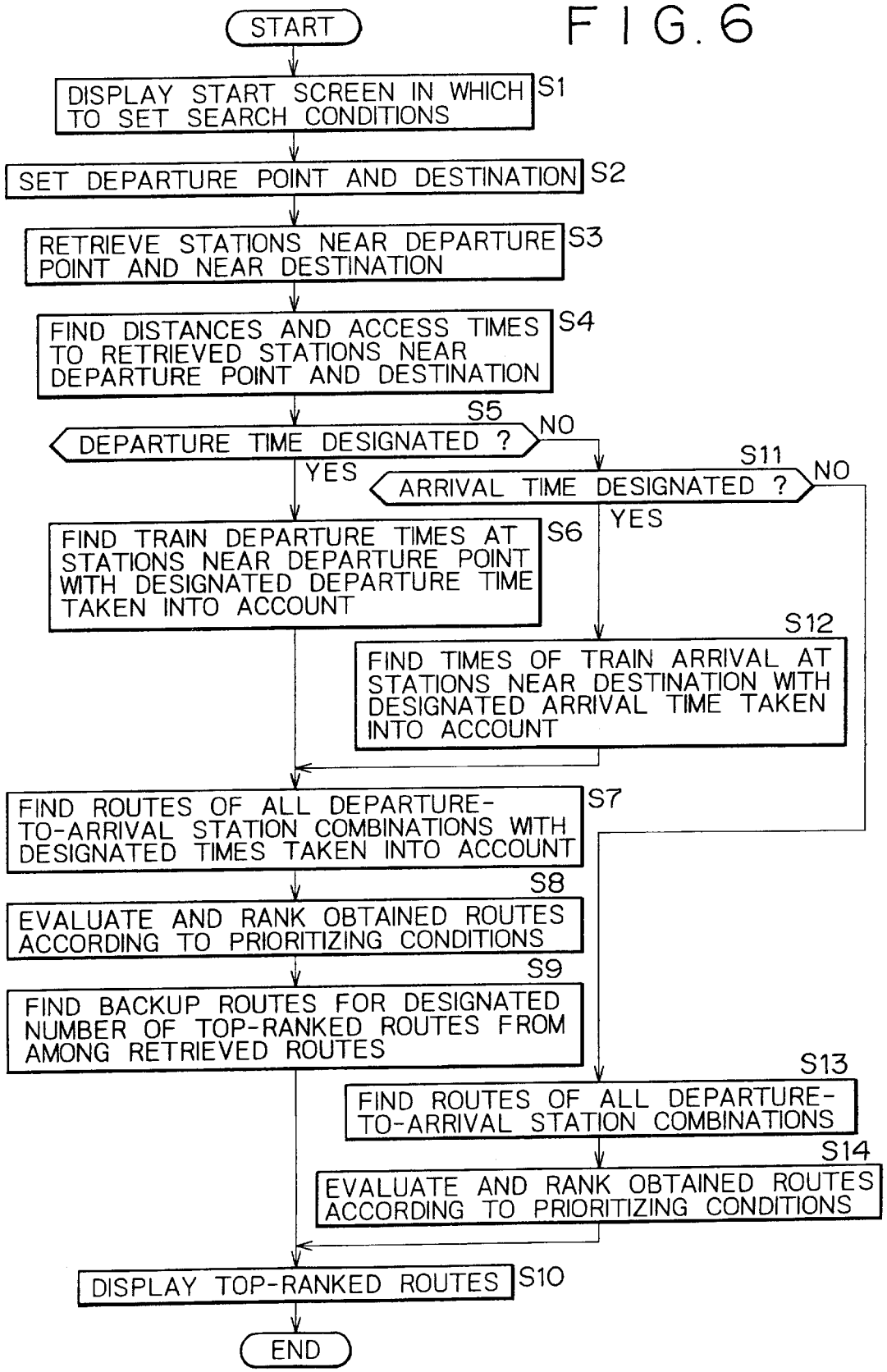
FIG. 6 is a flowchart of steps constituting processes for a route search performed by the personal computer in FIG. 1.

Described below with reference to the flowchart of FIG. 6 is a set of processes designed to search for the optimum route from a departure point to a destination by use of the navigation program 54F.

The processing is started by the user operating the keyboard 5 or touch-sensitive pad 6 to activate the navigation program 54F in the RAM 54.

Figure 7:
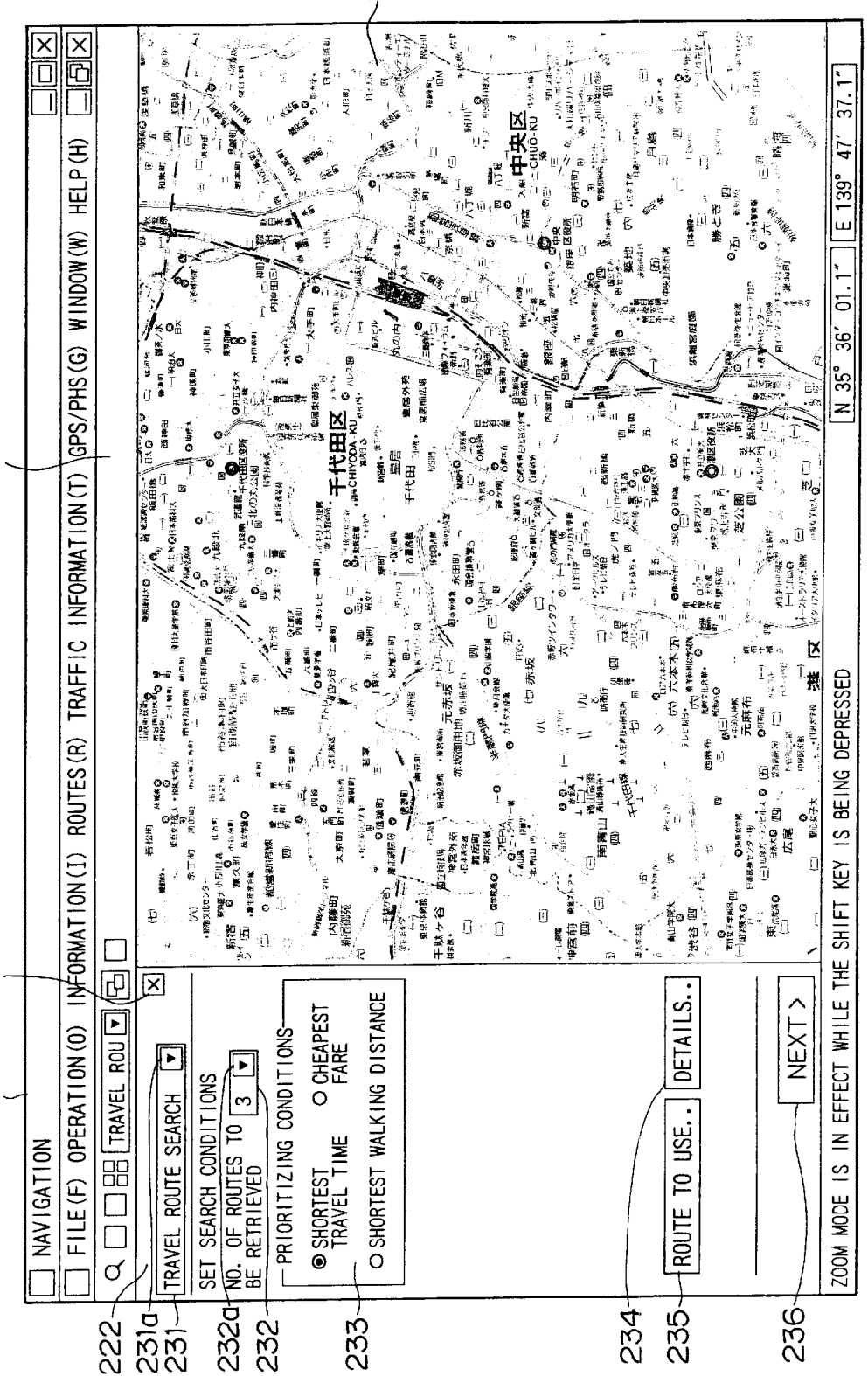
FIG. 7 is a view of a setting screen displayed on an LCD shown in FIG. 1.

In step S1, the CPU 51 displays on the LCD 7 a navigation program start screen shown in FIG. 7 in response to the input from the keyboard 5 or from the touch-sensitive pad 6. The user enters search conditions according to the indications on display.

In FIG. 7, the start screen shows a map as a sub-window 221 on the right under a tool bar 211 of the main body. On the left under the tool bar 211 is a route search window 222.

The root search window 222 includes, from top to bottom, a search mode display field 231, a search route count display field 232, a prioritizing condition selection field 233, a detail setting button 234, a route-to-use button 235, and a next button 236.

The search mode display field 231, when a button 231*a* located alongside is clicked on, reveals a drop-down list (not shown) of multiple search modes. When one of the plural search modes is selected, the chosen mode is displayed. In this example, a "Travel Route Search" mode is shown selected. This is a mode in which to search for routes traveled on foot or by public transportation. Other mode options include a drive route search mode in which to search for routes traveled by vehicle as with conventional car navigation systems.

The search route count display field 232 indicates a desired number of the most promising routes to be selected from among the routes judged to be optimal as a result of a route search in accordance with prioritizing conditions, to be described later. The user clicks on a button 232*a* located to the right of the field 232 to display a drop-down list from which a desired route count is chosen. In this example, a count "3" is shown selected, so that the three most promising routes resulting from the route search will be subsequently displayed.

The prioritizing condition selection field 233 is used to select prioritizing conditions for a route search. The prioritizing conditions in this case are made up of "the shortest travel time," "the cheapest fare," and "the shortest walking distance," any of which may be selected by the user. As the wording implies, the "shortest travel time" is a condition that gives priority to the shortest travel time from the departure point to the destination. The "cheapest fare" condition gives priority to the lowest cost of travel between the departure point and the destination. The "shortest walking distance" condition gives priority to the shortest distances that must be traveled on foot. In this example, the "shortest travel time" condition is selected as the prioritizing condition (indicated by a marking).

The detail setting button 234, when clicked on by the user, displays a detail setting screen (not shown). On this screen, the user may designate settings used to search for, say, routes of which the walking distances are to be traveled by bicycle or by bus. The detail setting screen also permits establishment of a radial range and the desired number for retrieval of nearby train stations around the departure point or destination, as will be described later.

The route-to-use button 235, when clicked on by the user, displays a route-to-use setting screen (not shown). On this screen, the user may input settings used to search illustratively for routes along which an itinerary by train is specified.

Upon completing the above settings, the user may click on the next button 236 to invoke the next setting screen. The route search window 222 is closed if the user clicks on a close button 237.

The description of the flowchart in FIG. 6 is now resumed. When the user has input the relevant search conditions as described above and has clicked on the next button 236, the CPU 51 goes to step S2 and displays a setting screen of FIG. 8 on the LCD 7.

Figure 8:
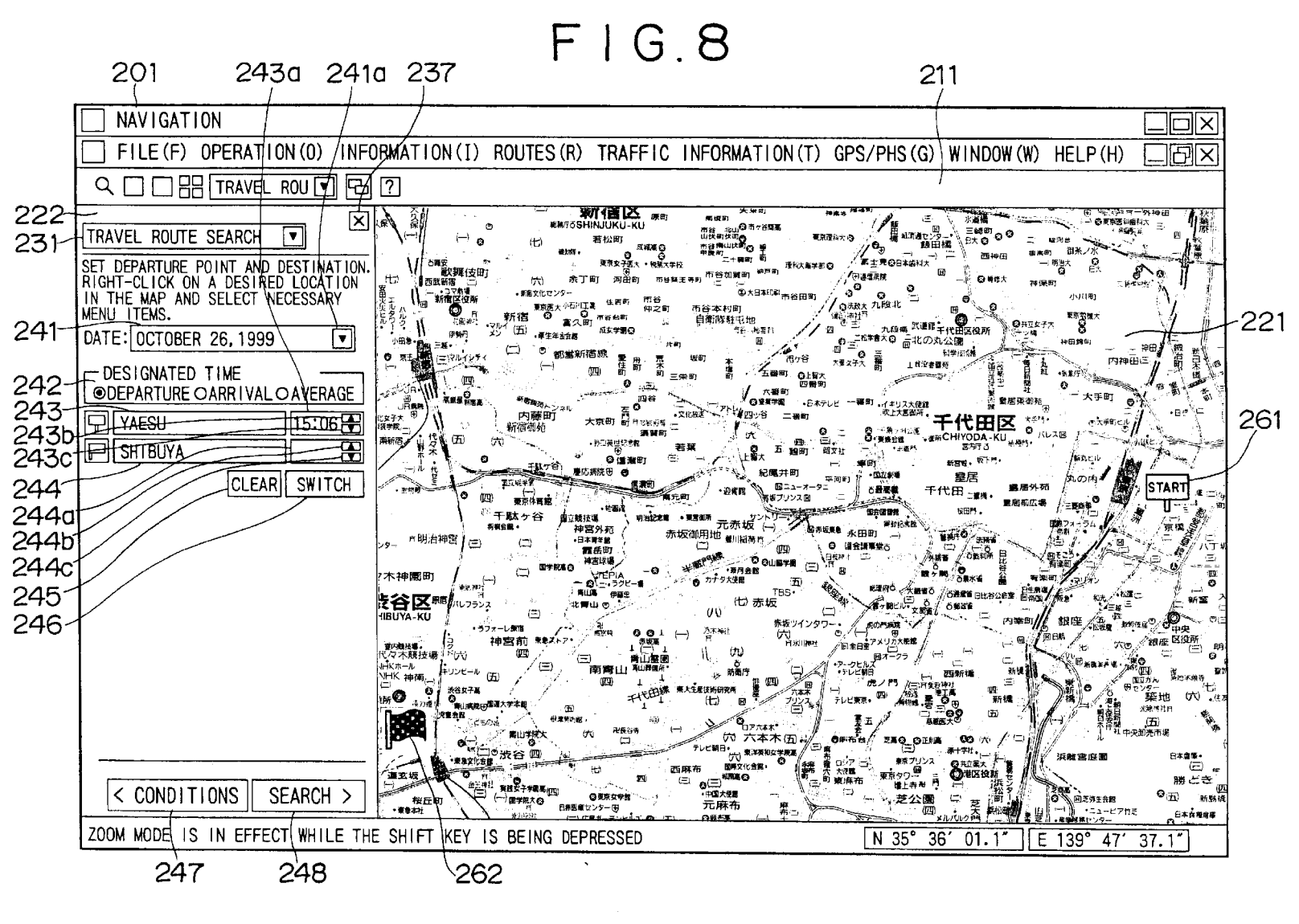

A route search window 222 in FIG. 8 includes, from top to bottom, a search date display field 241, a time designation selection field 242, a departure point name display field 243, a destination name display field 244, a clear button 245, a switch button 246, a condition button 247, and a search button 248.

The search date display field 241 shows the date on which to conduct a search. Clicking on a button 241*a* reveals a drop-down list (not shown) from which a desired date of search may be selected. The picked date is indicated in the search date display field 241. In this example, "Oct. 26, 1999" is shown designated.

The time designation selection field 242 displays time-related conditions for route searches, i.e., "start" for designating a departure time, "arrival" for specifying an arrival time, and "average" for making a route search over an average time span free of time setting constraints. In this example, the "start" condition is shown selected to designate: the departure time.

The departure point name display field 243 displays a geographical or other suitable name indicative of the departure point. A desired name may be input by setting the cursor to the departure point name display field 243. Alternatively, the touch-sensitive pad may be operated to select a desired location on the map of the sub-window 221. When the selected location on the map is clicked on, a search is made for that location and the results of the search are displayed. After the departure point has been designated, a departure point mark 261 appears at the applicable location on the map in the sub-window 221. A departure time display field 243*a* shows a designated departure time at which to leave the departure point. Clicking on a button 243*b* moves the time indication forward; clicking on a button 243*c* sets the time indication back.

The destination name display field 244 shows the name of the destination. As with the departure point name display field 243, a desired destination name may be input by setting the cursor to the destination name display field 244. Alternatively, the touch-sensitive pad may be operated to select a desired location on the map in the sub-window 221. When the selected location on the map is clicked on, a search is made for that location and the results of the search are displayed. After the destination has been designated, a destination mark 262 appears at the applicable location on the map in the sub-window 221. An arrival time display field 244*a* indicates a designated time of arrival at the destination.

Clicking on a button 244b moves the time indication forward; clicking on a button 244c sets the time indication back. The destination name display field 244 shows the name of the destination. As with the departure point name display field 243, a desired destination name may be input by setting the cursor to the destination name display field 244. Alternatively, the touch-sensitive pad may be operated to select a desired location on the map in the sub-window 221. When the selected location on the map is clicked on, a search is made for that location and the results of the search are displayed. After the destination has been designated, a destination mark 262 appears at the applicable location on the map in the sub-window 221. An arrival time display field 244a indicates a designated time of arrival at the destination. Clicking on a button 244b moves the time indication forward; clicking on a button 244c sets the time indication back.

In this example, the departure time has been selected in the time designation selection field 242. Thus a departure time "15:06" is illustratively indicated only in the departure time display field 243a.

The clear button 245, when clicked on by the user, erases the contents in the search date display field 241, departure point name display field 243, and destination name display field 244.

The switch button 246, when clicked on by the user, switches the departure point name in the departure point name display field 243 and the destination name in the destination name display field 244. The switching of the names makes it easy to search for routes including a return journey.

Clicking on the condition button 247 restores the condition setting screen of FIG. 7. Clicking on the search button 248 causes the CPU 51 to start searching for routes in keeping with the above-described settings.

The description of the flowchart in FIG. 6 is again taken up below. When the settings about the departure point and destination have been completed and the search button 248 is clicked on in step S2, step S3 is reached.

In step S3, the CPU 51 retrieves a desired number of train stations within a designated radius of the input departure point and of the entered destination.

In step S4, the CPU 51 finds distances and travel times to the retrieved stations close to the departure point and destination. Illustratively, if a nearby station is to be reached on foot, the walking time to that station is obtained as the travel time.

In step S5, the CPU 51 checks to see if a departure time is designated. Since the departure time has been designated in this example, step S6 is reached.

In step S6, the CPU 51 acquires train departure times at each of all retrieved nearby stations with the travel times to these stations taken into account. For example, suppose that the time to leave the departure point is 10:00; that there are three nearby stations 1 through 3; and that it takes 5, 6 and 8 minutes to reach the stations 1, 2 and 3 respectively from the departure point. In that case, the CPU 51 obtains illustratively train departure times of 10:05 at the station 1, 10:06 at the station 2, and 10:08 at the station 3. In step S6, the CPU 51 acquires train departure times at each of all retrieved nearby stations with the access times to these stations taken into account. In operation, the CPU 51 gains access to a search engine for train route selection at the Internet service provider 77 via the modem 75 over the telephone line 76. Using the search engine, the CPU 51 finds train departure times at all nearby stations with respect to the designated departure time. More specifically, the CPU 51 queries the search engine about train departures later than the designated departure time plus the access time regarding each station, receives the obtained train departure times, and stores the received data onto the HDD 67.

In step S7, the CPU 51 finds routes and train fares of all possible combinations of departure stations and arrival stations. Specifically, the CPU 51 transmits information on all train departure times at the stations near the departure point and the train stations close to the destination for output to the search engine for train route selection at the Internet service provider 77 via the modem 75 over the telephone line 76. The CPU 51 queries the search engine about the routes and fares regarding all departure-to-arrival station combinations using the designated departure times as constraints, receives the results of the retrieval, and stores the received results onto the HDD 67.

In step S8, the CPU 51 evaluates all obtained routes by checking the routes and fares supplemented by walking times up to the nearby stations against the prioritizing condition in effect, and ranks the routes accordingly. In this example, the "shortest travel time" condition is given priority, so that the retrieved routes are ranked in ascending order of the travel duration.

Figure 9:
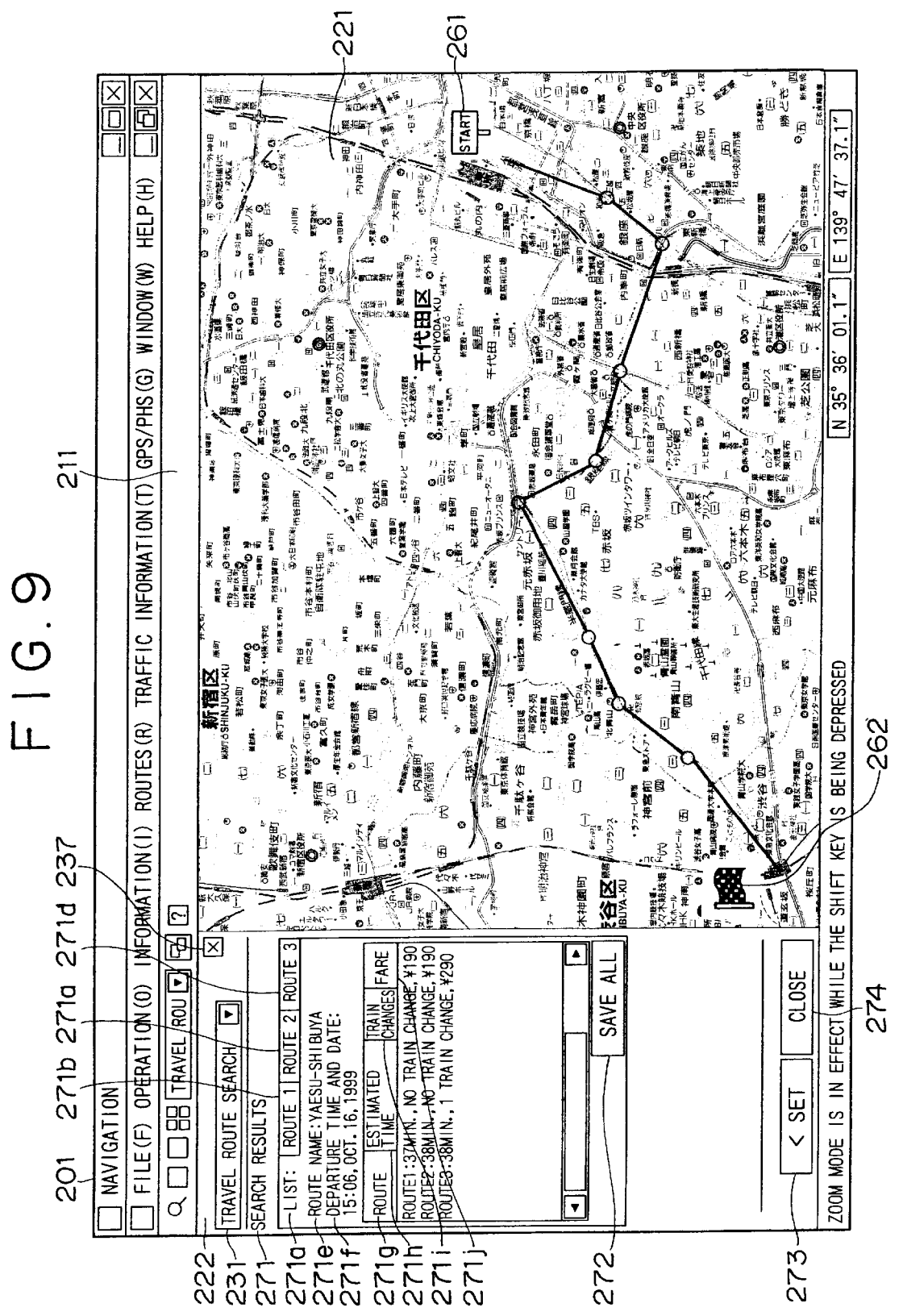

In step S9, the CPU 51 causes the search engine to compute a backup itinerary of each of the ranked routes, the backup being used if the departure time of any of the routes obtained in step S6 is missed. The CPU 51 receives the computed backup itineraries and stores them onto the HDD 67. The backup itinerary data are needed in a print process, to be described later by referring to a flowchart of FIG. 12. In step S10, the CPU 51 selects the designated number of the top-ranked routes, and displays the selected routes on the LCD 7 as shown in FIG. 9. This terminates the processing of the route search.

The results of the route search are displayed as illustrated in FIG. 9. The sub-window 221 indicates by thick lines an optimum route from the departure point mark 261 to the destination mark 262. The route search window 222 includes: a tab 271a indicating a list of retrieved routes, a tab 271b giving information about the route 1 that is the most optimum route, a tab 271c showing information about the second-best route 2, and a tab 271d affording information about the third-best route 3. In this example, the tab 271a giving the route list is selected and displayed.

Under the tab 271a is a route name display field 271e that shows the name of the route. In this example, a route name "Yaesu-Shibuya" is displayed. Under the route name display field 271e is a departure time/date display field 271f that shows, in this case, the time and date "15:06, Oct. 26, 1999" designated in FIG. 8. If an arrival time has been designated, then the field 271f turns into an arrival time display field indicating the designated time of arrival.

Under the departure time/date display field 271f is a route display field 271g showing three routes 1 through 3 retrieved in accordance with the settings made in FIG. 7. To the right of each route indication are an estimated travel time, the number of train changes required, and the fare, all relevant to the route in question. In this example, as indicated, the route 1 is associated with an estimated travel time of 37 minutes, no train change, and a train fare of ¥190; the route 2 involves an estimated travel time of 38 minutes, no train change, and a train fare of ¥190; the route 3 entails an estimated travel time of 38 minutes, one train change, and a train fare of ¥290.

Figure 10:
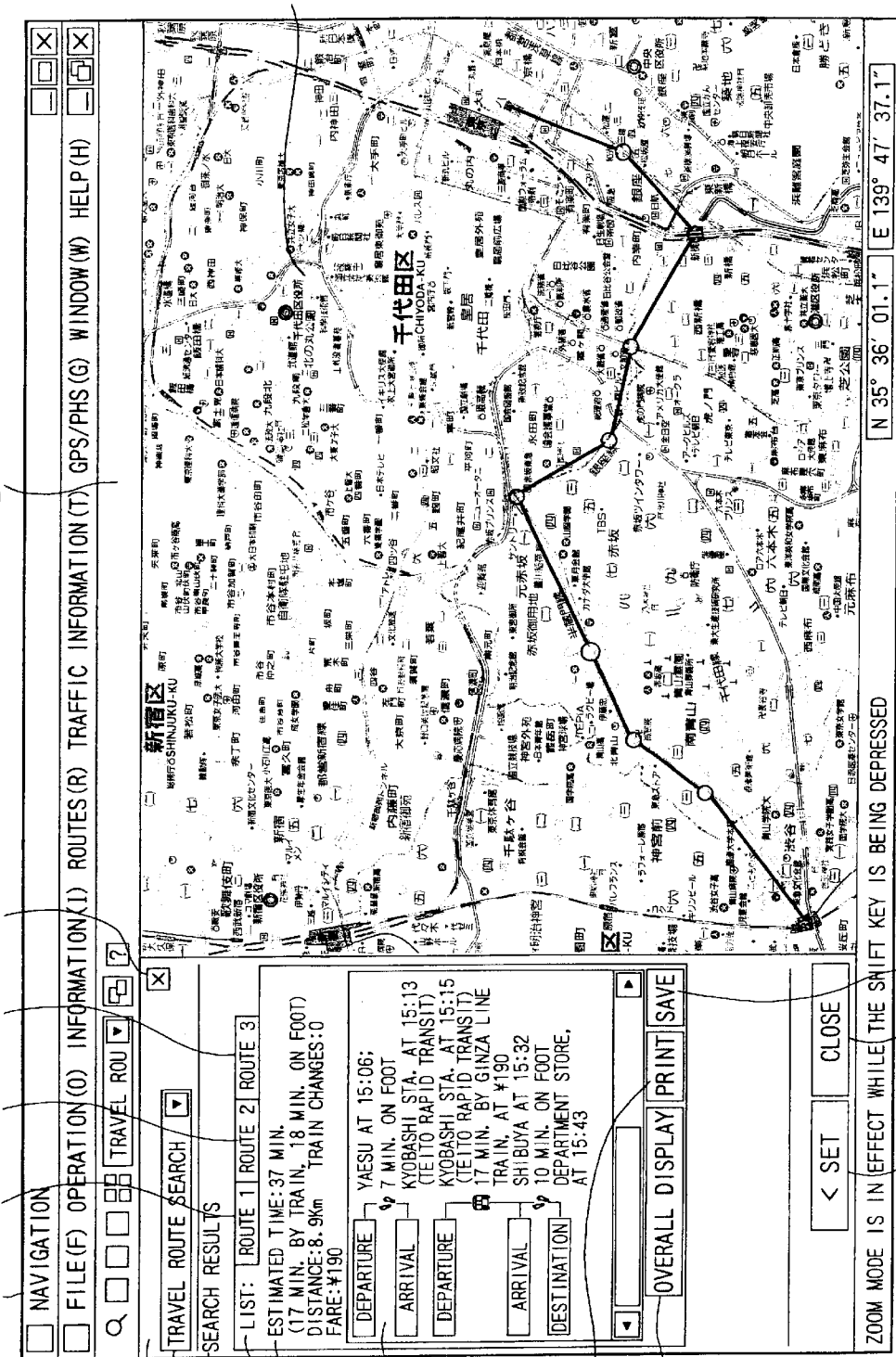
FIG. 10 is a view of another search result display screen appearing on the LCD in FIG. 1.

A save-all button 272, when clicked on, causes the information about all retrieved routes to be stored onto the HDD 67. Clicking on the tab 271b in FIG. 9 displays details of the route 1 as shown in FIG. 10. FIG. 10 shows a typical screen that appears when the tab 271b of the route 1 is clicked on. In this screen, the route search window 222 includes a detail display field 281 that indicates the estimated travel time, distance traveled, the number of train changes, and fare relevant to a given route. In this example, the field 281 shows an estimated travel time of 37 minutes (17 minutes by train, 18 minutes on foot), a distance of 8.9 km, no train change, and a fare of ¥190.

Under the detail display field 281 is a route display field 281a which in this example shows the following specifics: after starting the departure point "Yaesu" at 15:06, a user will walk seven minutes to reach the nearest subway station called Kyobashi of the Teito Rapid Transit Authority, at 15:13. Taking a 15:15 Ginza Line train bound for Shibuya, the user will arrive at Shibuya Station 17 minutes later. From Shibuya Station, it will take the user 10 minutes to reach the destination which in this case is a department store.

The same applies to the tabs 271c and 271d regarding the routes 2 and 3 respectively.

Figure 11:
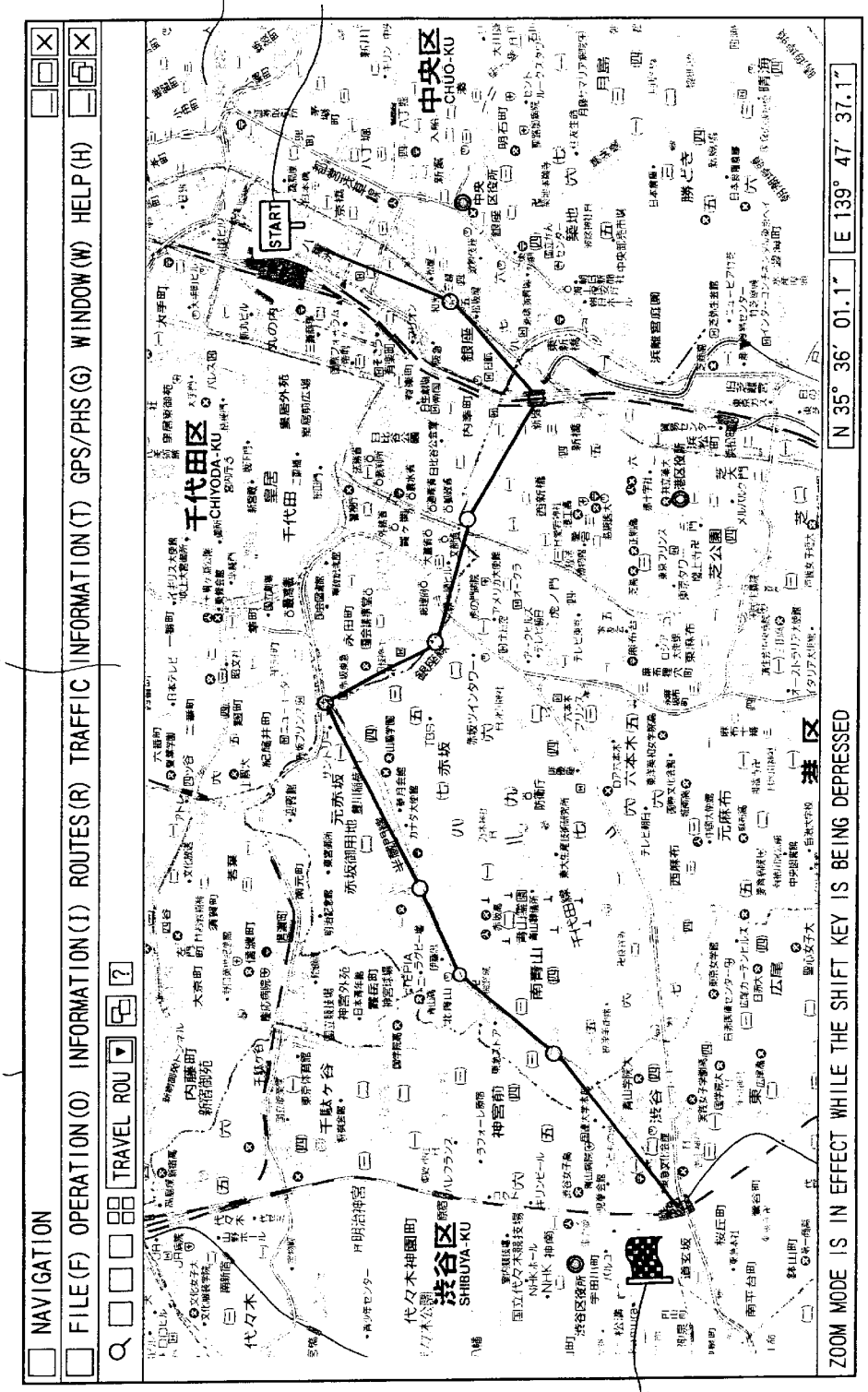
FIG. 11 is a view of an overall display screen showing the results of the search in FIG. 10.

Under the route display field 281a are an overall display button 282, a print button 283, and a save button 284. The overall display button 282, when clicked on by the user, displays a map showing routes from the departure point to the destination as indicated in FIG. 11. Clicking on the print button 283 causes the main window 201 in FIG. 10 to be printed. Clicking on the save button 284 allows the information about the route 1 to be saved onto the HDD 67.

In step S5, a check is made to see if a departure time is designated. If no departure time is judged to be designated, step S11 is reached. In step S11, a check is made to see if an arrival time is designated. If in step S11 an arrival time is judged to be designated, step S12 is reached.

In step S12, the CPU 51, given the designated time of arrival, obtains arrival times at the retrieved nearby stations on the basis of the estimated travel times to these stations. Step S12 is followed by step S7, and subsequent steps are repeated.

If in step S11 no arrival time is judged to be designated, i.e., if the average travel time option is judged to be in effect, then step S13 is reached. In step S13, the CPU 51 transmits information on all obtained stations near the departure point and all acquired stations near the destination, free of time constraints, via the model 75 over the telephone line 76 for output to the search engine for train route selection at the Internet service provider. The CPU 51 queries the search engine about routes and fares of all departure-to-arrival station combinations, and receives the results of the search before reaching step S14.

In step S14, the CPU 51 evaluates all obtained routes by checking the routes and fares held on the HDD 27, supplemented by walking times up to the nearby stations, against the prioritizing condition in effect, and ranks the routes accordingly. Step S14 is followed by step S10 and subsequent steps are repeated.

Figure 12:
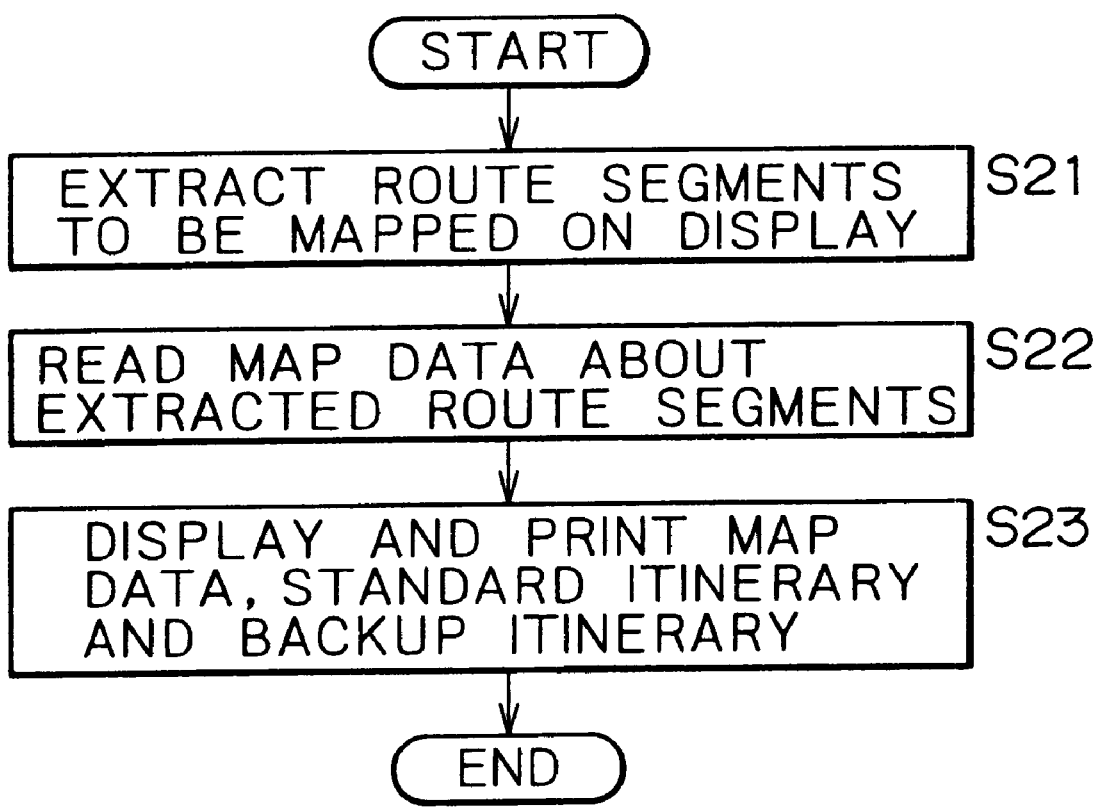
FIG. 12 is a flowchart of steps constituting a process of printing results of the search in FIG. 10.
Figure 13:
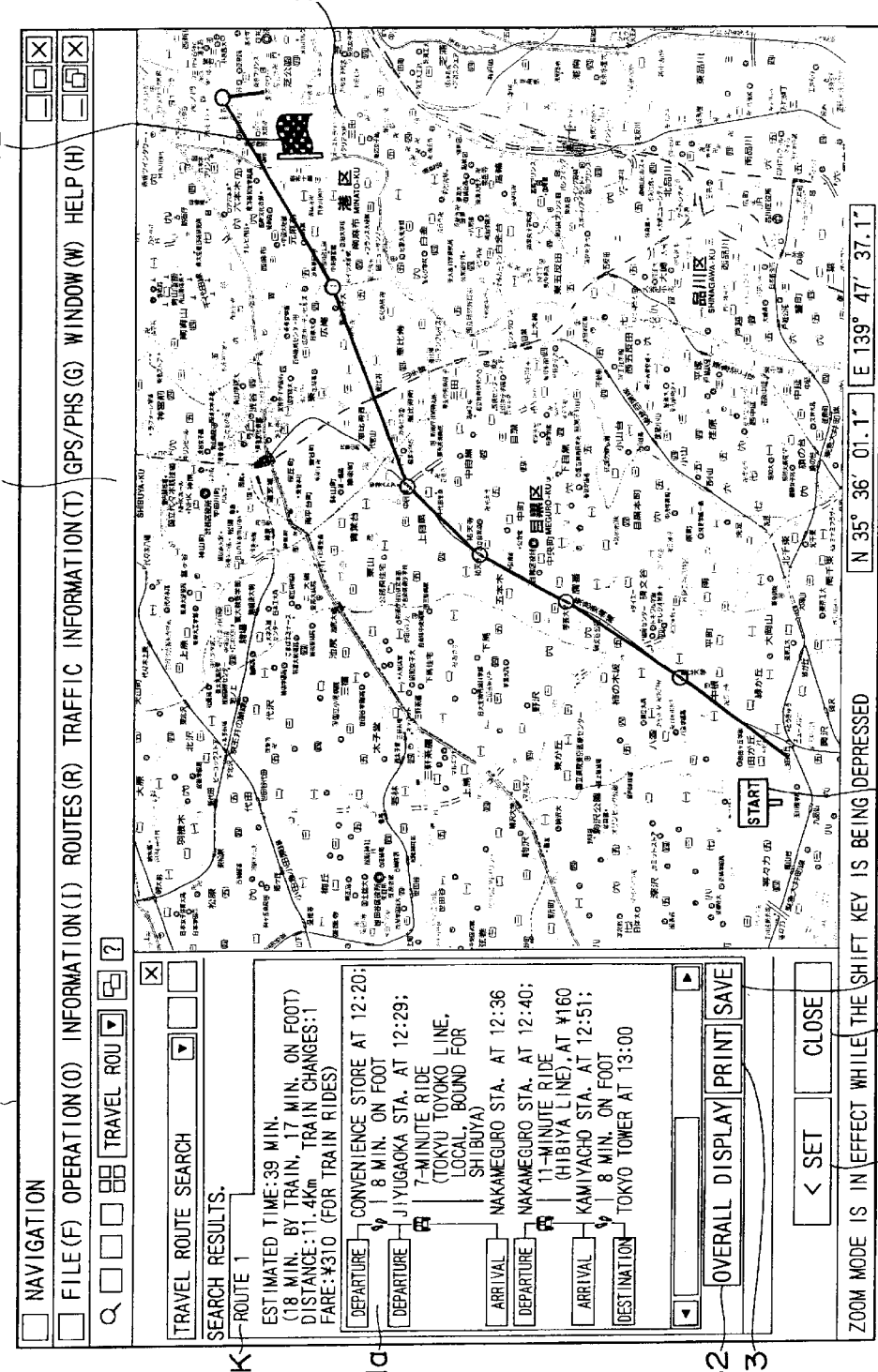
FIG. 13 is a view showing typical results of the search.

Described below with reference to the flowchart of FIG. 12 is what happens when the print button 283 is clicked on to display a print preview. Illustratively, suppose that the departure point is a convenience store, the destination is "Tokyo Tower," the number of routes to be retrieved is one, and the departure time is 12:20. When the processing in the flowchart of FIG. 6 is carried out, the results of the processing are displayed as shown in FIG. 13 (corresponding to FIG. 10 in the explanation of the processing in the flowchart of FIG. 6). With the print button 283 clicked on by the user, the processing of FIG. 12 is started.

In step S21, the CPU 51 extracts route segments to be mapped from the obtained optimum route. In this example, as shown in FIG. 13, a segment from the convenience store to Jiyugaoka Station and another segment from Kamiyacho Station to Tokyo Tower, to be covered on foot, need to be mapped. These are the route segments to be extracted.

In step S22, the CPU 51 reads from the navigation program 54F map data about the segments extracted in step S21, i.e, the segment between the convenience store and Jiyugaoka Station and the segment between Kamiyacho Station and Tokyo Tower. The retrieved map data are placed into the cache memory 55.

Figure 14:
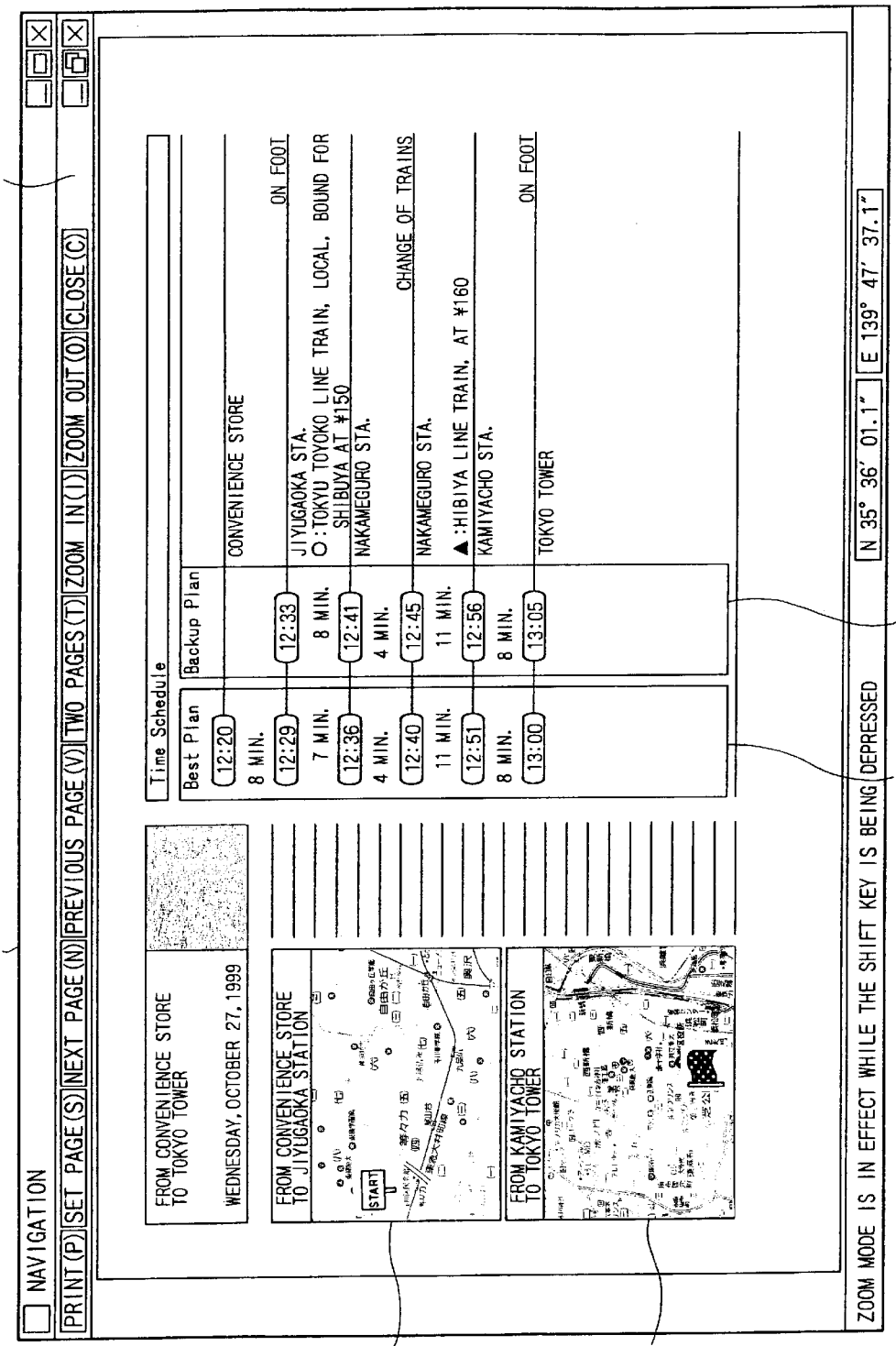
FIG. 14 is a view of a print preview.

In step S23, the CPU 51 displays, in a main window 201a of FIG. 14, a print preview comprising the map data from the cache memory 55 as well as the standard and backup itinerary data stored on the HDD 67 in steps S7 and S9 of FIG. 6. This completes the processing of FIG. 12. When the "Print" button in the leftmost position on the tool bar 211a is clicked on, the CPU 51 causes the printer 131 to print the print-ready data shown in FIG. 14.

FIG. 14 shows a typical print preview. On the left-hand side in FIG. 14 are maps showing the route segments to be covered on foot. The map 291 comprises the segment from the convenience store to Jiyugaoka Station, and the map 292 includes the segment from Kamiyacho Station to Tokyo Tower.

An itinerary display field 293 marked as "Best Plan" displays an itinerary made up of the optimal times retrieved. A backup itinerary display field 294 shown as "Backup Plan" reveals a backup itinerary to be adopted when any one of the departure times (in the itinerary display field 293) at the nearby departure stations is missed.

The itinerary display field 293 in this example indicates the following itinerary: after leaving the departure point, i.e., the convenience store, at 12:20, a user will walk eight minutes to reach the nearest station Jiyugaoka. There, the user will take a 12:29 Tokyu Toyoko Line train for a seven-minute ride to Nakameguro Station, to be reached at 12:36. After changing trains at Nakameguro over a period of four minutes, the user will take a 12:40 Hibiya Line train for an 11-minute ride to Kamiyacho Station, to be reached at 12:51. From there, the user will walk eight minutes to reach the destination, that is Tokyo Tower, at 13:00.

The backup itinerary display field 294, on the other hand, shows the following backup itinerary: if the train leaving Jiyugaoka Station at 12:29 (computed as the optimum train) is missed, then the user will take a 12:33 backup train for an eight-minute ride to Nakameguro Station, to be reached at 12:41. After changing trains at Nakameguro over a four-minute period, the user will take a 12:45 Hibiya Line train for an 11-minute ride to Kamiyacho Station, to be reached at 12:56. From there, the user will walk eight minutes to reach the destination that is Tokyo Tower, at 13:05.

In the above example, the walking times each contain a one-minute supplementary margin.

Also in the example, the number of routes to be retrieved was shown to be set for one. Alternatively, there may be, say, three routes to be retrieved as explained in connection with the flowchart of FIG. 6. In that case, as shown in FIG. 10, the routes 1 through 3 may each be subjected to the above processing by clicking on the print button 283. Many more routes may also be retrieved, and the print data may be suitably divided and printed over a plurality of pages.

In the example above, the route segments to be mapped are those covered on foot. Alternatively, the route segments to be mapped may be those traveled by bicycle or by other means other than public transportation.

The series of steps described above may be executed either by hardware or by software. Where the steps are to be carried out by software, relevant programs constituting the software need to be installed either in a dedicated hardware component of a computer, or loaded from a suitable program storage medium into, say, a general-purpose personal computer capable of implementing various functions based on the programs installed therein.

As shown in FIG. 5, the program storage medium is offered to the user in diverse forms, such as the hard disc drive 67 which is incorporated beforehand in the personal computer 1 and which has the necessary programs preinstalled thereon. Alternatively, the program storage medium may be offered as a package medium independent of the computer: a magnetic disc 121 (including floppy discs), an optical disc 122 (including CD-ROM (Compact-Disc read only memory)) and DVD (digital versatile disc), a magneto-optical disc 123 (including MD (Mini-disc)), or a semiconductor memory 124, all carrying the relevant programs provided for the user.

In this specification, the steps which are preserved on the program storage medium and which describe the programs to be executed represent not only processes that are carried out in the depicted sequence (i.e., on a time series basis) but also those that are conducted parallelly or individually.

Although routes between the departure point and the destination were obtained in the above example, that is not limitative of the invention. Stopover points may also be added. In such a case, each stopover point is regarded as a temporary destination with respect to the departure point and a route between the two points is acquired. Each stopover point is then considered a temporary departure point with regard to the destination and a route between the two point is obtained. Optimum routes acquired between the departure point and each stopover point as well as between each stopover point and the destination are combined. From such route segment combinations, the best route is selected optimally to link the departure point, stopover points, and destination.

Although a train route search engine on the Internet has been used in the above example, this is not limitative of the invention. Alternatively, a train route search engine installed in the computer may be employed instead.

The series of steps described above may be executed, again, either by hardware or by software. Where the steps are to be carried out by software, relevant programs constituting the software need to be installed either in a dedicated hardware component of a computer, or loaded from a suitable program storage medium into, say, a general-purpose personal computer capable of implementing various functions based on the programs installed therein.

As shown in FIG. 5, again, the program storage medium is offered to the user in diverse forms, such as the hard disc drive 67 which is incorporated beforehand in the personal computer 1 and which has the necessary programs preinstalled thereon. Alternatively, the program storage medium may be offered as a package medium independent of the computer: a magnetic disc 121 (including floppy discs), an optical disc 122 (including CD-ROM (Compact-Disc read only memory)) and DVD (digital versatile disc), a magneto-optical disc 123 (including MD (Mini-disc)), or a semiconductor memory 124, all carrying the relevant programs provided for the user.

In this specification, again, the steps which are preserved on the program storage medium and which describe the programs to be executed represent not only processes that are carried out in the depicted sequence (i.e., on a time series basis) but also those that are conducted parallelly or individually.

As many apparently different embodiments of this invention may be made without departing from the spirit and scope thereof, it is to be understood that the invention is not limited to the specific embodiments thereof except as defined in the appended claims.

What is claimed is:

1. An information processing apparatus comprising:
   inputting means for inputting a departure point and a destination;
   nearby station retrieving means for retrieving stations located near said departure point and said destination which were input through said inputting means;
   train route searching means which, if there are a plurality of stations near at least either said departure point or said destination, the nearby stations having been retrieved by said nearby station retrieving means, then searches for at least one train route for each of all nearby station combinations linking said departure point to said destination;
   storing means for storing the train routes retrieved by said train route searching means;
   setting means for setting prioritizing conditions to be referenced when said train route searching means searches for train routes; and
   ranking means for ranking the train routes stored in said storing means in accordance with said prioritizing conditions set by said setting means.

2. An information processing apparatus according to claim 1, wherein said nearby station retrieving means retrieves at most a predetermined number of stations located within a predetermined radius of either said departure point or said destination.

3. An information processing apparatus according to claim 1, wherein said train route searching means either utilizes over a network a train route search engine located externally, or uses a train route search engine installed within said train route searching means.

4. An information processing apparatus according to claim 1, wherein said prioritizing conditions include at least one of a travel time involved, an amount of fares involved, and a walking time.

5. An information processing method comprising the steps of:
   inputting a departure point and a destination;
   retrieving stations located near said departure point and said destination which were input in said inputting step;
   if there are a plurality of stations near at least either said departure point or said destination, the nearby stations having been retrieved in said nearby station retrieving step, then searching for at least one train route for each of all nearby station combinations linking said departure point to said destination;
   storing the train routes retrieved in said train route searching step;
   setting prioritizing conditions to be referenced when said train route searching step searches for train routes; and
   ranking the train routes stored in said storing step in accordance with said prioritizing conditions set in said setting step.

6. A program storage medium which stores a program in a manner readable by a computer, said program comprising the steps of:

controlling input of a departure point and a destination;

retrieving stations located near said departure point and said destination which were input in said input controlling step;

if there are a plurality of retrieved stations near at least either said departure point or said destination, the nearby stations having been retrieved in said nearby station retrieving step, then searching for at least one train route for each of all nearby station combinations linking said departure point to said destination;

controlling storage of the train routes retrieved in said train route searching step;

setting prioritizing conditions to be referenced when said train route searching step searches for train routes; and ranking the train routes stored in said storage controlling step in accordance with said prioritizing conditions set in said setting step.

7. An information processing apparatus comprising:

inputting means for inputting a departure point and a destination;

nearby station retrieving means for retrieving stations located near said departure point and said destination which were input through said inputting means;

distance retrieving means for retrieving a distance from said departure point input by said inputting means to a station near said departure point retrieved by said nearby station retrieving means, as well as a distance from said destination input by said inputting means to a station near said destination retrieved by said nearby station retrieving means;

travel time computing means which, based on results of the retrieval by said distance retrieving means, computes a period of time required to travel from said departure point to a nearby station thereof and a period of time required to travel from said destination to a nearby station thereof; and train route searching means which, if there are a plurality of stations near at least either said departure point or said destination, the nearby stations having been retrieved by said nearby station retrieving means, then searches for at least one train route for each of all nearby station combinations linking said departure point to said destination on the basis of results of the computation by said travel time computing means.

8. An information processing apparatus according to claim 7, wherein said nearby station retrieving means retrieves at most a predetermined number of stations located within a predetermined radius of either said departure point or said destination.

9. An information processing apparatus according to claim 7, wherein said train route searching means either utilizes over a network a train route search engine located externally, or uses a train route search engine installed within said train route searching means.

10. An information processing method comprising the steps of:

inputting a departure point and a destination;

retrieving stations located near said departure point and said destination which were input in said inputting step;

retrieving a distance from said departure point input in said inputting step to a station near said departure point retrieved in said nearby station retrieving step, as well as a distance from said destination input in said inputting step to a station near said destination retrieved in said nearby station retrieving step;

based on results of the retrieval by said distance retrieving step, computing a period of time required to travel from said departure point to a nearby station thereof and a period of time required to travel from said destination to a nearby station thereof; and if there are a plurality of stations near at least either said departure point or said destination, the nearby stations having been retrieved in said nearby station retrieving step, then searching for at least one train route for each of all nearby station combinations linking said departure point to said destination on the basis of results of the computation by said travel time computing step.

11. A program storage medium which stores a program in a manner readable by a computer, said program comprising the steps of:

controlling input of a departure point and a destination;

retrieving stations located near said departure point and said destination which were input in said input controlling step;

retrieving a distance from said departure point input in said input controlling step to a station near said departure point retrieved in said nearby station retrieving step, as well as a distance from said destination input in said input controlling step to a station near said destination retrieved in said nearby station retrieving step;

based on results of the retrieval by said distance retrieving step, computing a period of time required to travel from said departure point to a nearby station thereof and a period of time required to travel from said destination to a nearby station thereof; and if there are a plurality of stations near at least either said departure point or said destination, the nearby stations having been retrieved in said nearby station retrieving step, then searching for at least one train route for each of all nearby station combinations linking said departure point to said destination on the basis of results of the computation by said travel time computing step.

12. An information processing apparatus according to claim 1, wherein said desired segment to be mapped is a segment of said optimum route to be traveled on foot.

13. An information processing apparatus according to claim 1, wherein said backup itinerary corresponds to a departure time later than a departure time of transportation acquired on the basis of at least one of said departure time and said arrival time.

14. An information processing apparatus according to claim 1, further comprising map acquiring means for acquiring a map of a desired segment of said optimum route.

* * * * *